JOHN DEVLIN.
Apparatus for Forcing Beer out of Barrels.
No. 127,156. Patented May 28, 1872.
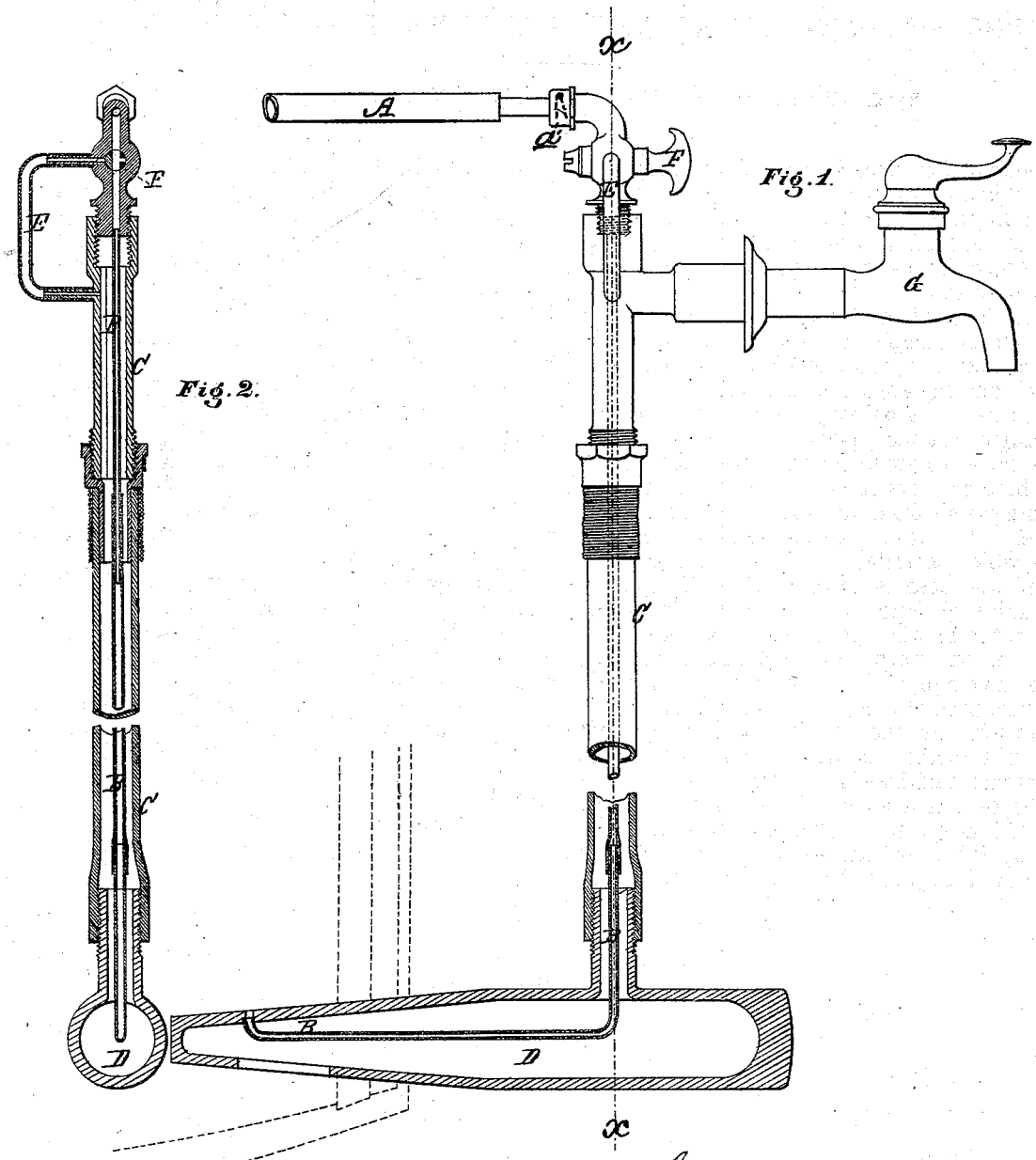

127,156

UNITED STATES PATENT OFFICE.

JOHN DEVLIN, OF BROOKLYN, NEW YORK.

IMPROVEMENT IN APPARATUS FOR FORCING BEER FROM BARRELS.

Specification forming part of Letters Patent No. 127,156, dated May 28, 1872.

Specification describing certain Improvements in Apparatus for Forcing Beer and other Liquors from Barrels in a cellar to the delivery-cocks in a bar-room, invented by JOHN DEVLIN, of Brooklin, Kings county, and State of New York.

The object of my invention is to convey air from an air-pump or other forcing mechanism into a beer or liquor barrel, and by means of the air and my apparatus force the beer out of the barrel to a delivery-cock, instead of employing numerous pipes and cocks for the purpose, as are now in common use; the nature of which consists of an interior pipe, for conveying the air from the pump, through a tap or faucet, into the beer-barrel, and an exterior pipe, which encircles the air-pipe, and through which the beer is forced out of the barrel, through said faucet, up to the delivery-cock, said internal air-pipe being provided with a cock for the purpose of shutting off the air from the air-pipe and turning the air into the external pipe, thereby forcing the beer in said pipe back into the beer-barrel when desired, as I will further explain by reference to the accompanying drawing, of which—

Figure 1 is a sectional elevation, showing internal air-pipe, external beer-passage pipe, faucet, and beer-barrel—the latter in dotted lines; and Fig. 2, a vertical section of same.

In the said drawing, A indicates a pipe leading from an air-pump (provided with a check-valve, $a'$) to the apparatus; B, the interior air-pipe, passing through the exterior beer-pipe C, through the faucet D, and into the beer-barrel. This interior air-pipe has a branch, E, which communicates with the interior air-pipe and the exterior beer-pipe, and is also provided with a two-way cock, F, for directing the air to the barrel and forcing the beer up the outer pipe to the delivery-cock G, or for shutting off the air from the air-pipe and turning the air into the external or beer pipe for the purpose of forcing the beer in the outer pipe back into the beer-barrel through the faucet.

What I claim is—

The air-pipe B, with its branch E and cock F, beer-pipe C, delivery-cock G, and faucet D, all combined, arranged, and operating substantially as and for the purposes described and set forth.

In testimony whereof I have hereunto set my signature this 17th day of April, 1872.

JOHN DEVLIN.

Witnesses:
ARTHUR NEILL,
SAML. L. CAVERLY.